United States Patent [19]

Roggeman et al.

[11] Patent Number: 4,501,866

[45] Date of Patent: Feb. 26, 1985

[54] CONTINUOUS METHOD FOR PREPARING HIGH CIS-1,4 POLYBUTADIENE

[75] Inventors: David M. Roggeman; Shrikant R. Malani, both of Akron; Jung W. Kang, Clinton, all of Ohio

[73] Assignee: The Firestone Tire & Rubber Company, Akron, Ohio

[21] Appl. No.: 633,814

[22] Filed: Jul. 23, 1984

[51] Int. Cl.$^3$ .................................................. C08F 4/82
[52] U.S. Cl. .................................. 526/133; 502/111; 502/117
[58] Field of Search ..................... 526/132, 133, 340.4; 502/111, 117

[56] References Cited

U.S. PATENT DOCUMENTS

| | | |
|---|---|---|
| 3,170,907 | 2/1965 | Ueda et al. |
| 3,432,517 | 3/1969 | Ueda .................................. 502/117 |
| 3,464,965 | 9/1969 | Yasunaga et al. |
| 3,471,462 | 10/1969 | Matsumoto et al. |
| 3,483,177 | 12/1969 | Throckmorton et al. |
| 3,487,063 | 12/1969 | Throckmorton et al. |
| 3,528,957 | 9/1970 | Throckmorton. |
| 3,769,270 | 10/1973 | Saltman et al. |
| 3,845,029 | 10/1974 | Throckmorton ................... 526/133 |
| 3,985,941 | 10/1976 | Pierson et al. |

FOREIGN PATENT DOCUMENTS

| | | |
|---|---|---|
| 3630072 | 11/1983 | European Pat. Off. |
| 1499638 | 2/1978 | United Kingdom. |

Primary Examiner—Paul R. Michl
Attorney, Agent, or Firm—Frank J. Troy, Sr.

[57] ABSTRACT

A method for preparing high cis-1,4 polybutadiene by a continuous process which involves the continuous polymerization of 1,3-butadiene in solution under adiabatic conditions is provided. The method comprises the steps of: (I) feeding continuously to a single agitated polymerization reactor: (a) a monomer stream comprising 1,3-butadiene in a hydrocarbon solvent; (b) a preformed $\pi$ allyl catalyst stream formed by admixing a carboxylated metal oxy borate compound represented by the formulae $(RCOOMO)_3B$ or $(ROCOOMO)_2B-OR'$ wherein R and R' are alkyl radicals containing from 7 to 17 carbon atoms and M is nickel or cobalt, an organo aluminum compound, an alcohol, a small amount of 1,3-butadiene and a hydrocarbon solvent; and (c) a cocatalyst stream comprising a boron trifluoride complex with an alcohol; and (II) withdrawing continuously from said reactor high cis-1,4 polybutadiene at the same rate as said monomer, preformed catalyst and cocatalyst streams are fed to the reactor.

In an additional embodiment of the invention, a method of preparing a preformed $\pi$ allyl catalyst having improved stability and solubility in hydrocarbon solvent is provided.

High cis-1,4 polybutadiene polymers produced by the method of the invention have good green strength and tack and may be used as tire rubbers and impact modifiers for plastics.

18 Claims, No Drawings

CONTINUOUS METHOD FOR PREPARING HIGH CIS-1,4 POLYBUTADIENE

BACKGROUND OF THE INVENTION

The invention relates to a continuous method for preparing high cis-1,4 polybutadiene. More particularly, the invention relates to a continuous method of preparing high cis-1,4 polybutadiene by continuously polymerizing 1,3-butadiene in solution under adiabatic conditions by a procedure which involves continuously feeding to a single agitated polymerization reactor a 1,3-butadiene monomer stream, a preformed $\pi$ allyl catalyst stream, and a cocatalyst stream while withdrawing high cis-1,4 polybutadiene at the same rate as said monomer, preformed catalyst and cocatalyst streams are fed to the reactor.

Various methods for preparing high cis-1,4 polybutadiene using catalyst systems comprising organonickel or organocobalt compounds, organo-aluminum compounds such as trialkyl aluminum compounds and fluorine-containing compounds such as boron trifluoride complexes, hydrogen fluoride and hydrogen fluoride complexes have been known in the prior art as illustrated, for example, by U.S. Pat. Nos. 3,170,907; 3,464,865; 3,371,462; 3,483,177; 3,487,063; 3,528,957; 3,769,270; and 3,985,941. However, the processes described in the above patents suffer from the significant disadvantage that they are batch-type polymerization processes. From a commercial standpoint, batch-type polymerization processes are not as desirable as continuous polymerization processes as the latter permits much greater production rates.

More recently, continuous polymerization processes have been proposed in the prior art. Thus, British Pat. No. 1,499,638 relates to a method of preparing high cis-1,4 polybutadiene which comprises continuously polymerizing butadiene in admixture with a reaction medium comprising an inert aliphatic or cycloaliphatic hydrocarbon employing as a catalyst a $CS_2$-free mixture comprising (A) at least one trialkyl aluminum wherein the alkyl group contains from 2 to 8 carbon atoms, (B) at least one nickel salt of a carboxylic acid, and (C) at leat one boron trifluoride complex with an ether in which each of the individual catalyst components are continuously separately injected into the polymerization vessel containing the mixture of the butadiene and the inert aliphatic or cycloaliphatic reaction medium.

European Patent Application No. 83630072.3 relates to a process for controlling the molecular weight of high cis-1,4 polybutadiene which comprises polymerizing 1,3-butadiene under solution polymerization conditions employing as a catalyst (1) at least one organoaluminum compound; (2) at least one organonickel compound selected from the group consisting of nickel salts of carboxylic acids, organic complex compounds of nickel and nickel tetracarbonyl; and (3) hydrogen fluoride or a hydrogen fluoride complex prepared by complexing hydrogen fluoride with a complexing compound of the group consisting of ketones, aldehydes, nitriles, esters, ethers, alcohols, phenols, mineral acids containing oxygen and water or mixtures thereof; wherein the polymerization is conducted at a temperature of from about 68° C. to about 107° C.; wherein the polymerization is conducted in the presence of small amounts of an olefin selected from the group consisting of ethylene, propylene, 1-butene, cis and trans 2-butene, 1,5-hexadiene, 1,4-hexadiene, 1,4-pentadiene, and 1,6-heptadiene and wherein the polymerization is a continuous process.

The processes described in the above British patent and the European patent application appear to be entirely distinguishable from the process of the present invention. Thus, the British patent and the European patent application both utilize a different nickel catalyst component than that employed in the process of the invention. In addition, both of these references appear to require that the catalyst addition be conducted by the in-situ addition method in which the individual catalyst components, i.e. the nickel compound, the organoaluminum compound and the fluorine compound (e.g. hydrogen fluoride, hydrogen fluoride complex, and boron trifluoride etherate) are separately injected into the polymerization zone. Moreover, the European patent application additionally requires the polymerization to be conducted in the presence of a small amount of an olefin.

The processes described in the British patent and the European patent application have the significant advantage of being continuous processes. However, the aforementioned processes also suffer from several significant disadvantages which materially limit their usefulness as commercial production processes. Thus, as disclosed in the Examples of the British patent and European patent application, the processes described therein utilize two (2) polymerization reactors connected in a chain or series. Moreover, as further disclosed in the examples therein, the rate of conversion of monomer to polymer is lower than desirable and the residence times longer than desirable for many commercial operations. Thus, the British patent process which utilizes two polymerization reactors achieves an average rate of conversion of about 75% at an average residence time of about 4.3 hours while the European patent application process, which also utilizes two polymerization reactors, achieves a rate of conversion of about 85% and residence times of from 2.5 to 3.0 hours (Example 1) and 1.5 to 2.0 hours (Example 2).

As will be evident from the foregoing, the discovery of a continuous process for preparing high cis-1,4 polybutadiene using a single reactor and which results in higher conversion rates at shorter residence times would constitute a significant advance over the processes of the British patent and the European patent application.

SUMMARY OF THE INVENTION

In accordance with the present invention, a method for preparing high cis-1,4 polybutadiene by a continuous process using a single polymerization reactor and which results in high rates of conversion at reduced residence times has been discovered. The method which involves continuously polymerizing 1,3-butadiene in solution under adiabatic conditions comprises the steps of:

(I) feeding continuously to a single agitated polymerization reactor:
  (a) a monomer stream comprising 1,3-butadiene in a hydrocarbon solvent;
  (b) a preformed $\pi$ allyl catalyst stream formed by admixing a carboxylated metal oxy borate compound represented by the formulae $(RCOOMO)_3B$ or $(RCOOMO)_2B$-OR' wherein R and R' are alkyl radicals containing from 7 to 17 carbon atoms and M is nickel or cobalt, an organoaluminum compound, an alcohol, a small amount of 1,3-butadiene and a hydrocarbon solvent; and (c) a cocatalyst stream comprising a boron trifluoride complex with an alcohol; and (II) withdrawing continuously from said reactor high cis-1,4 polybutadiene at the same rate as said monomer, preformed $\pi$ allyl catalyst and cocatalyst streams are fed to the reactor.

In an especially advantageous embodiment of the invention, a method of preparing a preformed $\pi$ allyl catalyst having improved stability and solubility in hydrocarbon solvent is also provided.

DETAILED DESCRIPTION OF THE INVENTION

As indicated, the method of the invention involves the continuous polymerization of 1,3-butadiene in hydrocarbon solvent under adiabatic conditions. The term "adiabatic" as referred to throughout the specification and claims herein means that the polymerization once it reaches steady state conditions is conducted without the addition or removal of heat. Thus, the heat generated during polymerization is the result of an exotherm. In the method of the present invention, polymerization is conducted adiabatically at temperatures ranging from about 50° C. to about 150° C.

The carboxylated metal oxy borate compounds which may be employed in forming the preformed catalyst component of the invention are compounds having either of the structures:

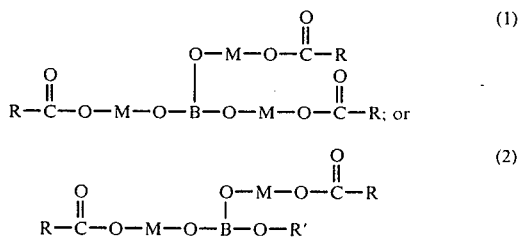

wherein R and R' are alkyl radicals containing from 7 to 17 carbon atoms, and M is nickel or cobalt. It should be noted that in certain instances, compounds in which R is less than 7 may be employed although the use of such compounds is not preferred due to their lack of solubility in hydrocarbon solvents. Nonetheless, such compounds may be utilized with certain mixtures of solvents. For the sake of convenience, these compounds may be represented by the shorthand formulae (RCOO-MO)$_3$B or (RCOOMO)$_2$B-OR' wherein R, R' and M are as defined above.

These carboxylated metal oxy borate compounds, such as the carboxylated nickel borate or the carboxylated cobalt borate, may be prepared by methods known in the art, such as, for example, by reacting a nickel or cobalt salt of a carboxylic acid with an alkoxide of boron as described in detail in U.S. Pat. No. 3,296,242, the disclosure of which is incorporated herein by reference. The preferred carboxylated metal oxy borate compounds employed in preparing the preformed catalyst component of the invention are those represented by the formula (RCOOMO)$_3$B wherein M is nickel or cobalt and R is an alkyl radical of from 7 to 11 carbon atoms. Also, for the sake of convenience, the carboxylated metal oxy borate compounds of the invention are hereinafter referred to as simply cobalt borates and nickel borates which may be further designated by the abbreviations CoOB and NiOB, respectively.

The term "organoaluminum compound," as employed herein, refers to organoaluminum compounds which correspond to the formula:

wherein R$_1$ is selected from the group consisting of alkyl (including cycloalkyl), aryl, alkaryl, arylalkyl, alkoxy, fluorine, and hydrogen, R$_2$ and R$_3$ being selected from the group of alkyl (including cycloalkyl), aryl, alkaryl, and arylalkyl.

Illustrative examples of compounds corresponding to the above formula which may be utilized include diethyl aluminum fluoride, di-n-propylaluminum fluoride, di-n-butylaluminum fluoride, diisobutylaluminum fluoride, dioctylaluminum fluoride, diphenylaluminum fluoride, trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum, and other triorganoaluminum compounds. Also included are dialkylaluminum alkoxides such as diethylaluminum ethoxide, diisobutylaluminum ethoxide, and dipropylaluminum methoxide and the like. Hydrides of such organoaluminum compounds may also be utilized including diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl p-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and the like.

The preferred organoaluminum compounds are the trialkyl aluminum compounds such as trimethyl aluminum, triethyl aluminum, tri-n-propyl aluminum, tri-n-butyl aluminum, triisobutyl aluminum, trioctyl aluminum and the like, and of these, triisobutyl aluminum is particularly preferred.

Alcohols which may be employed in preparing the preformed catalyst may be represented by the formula ROH wherein R is selected from the group consisting of alkyl, cycloalkyl, aryl and arylalkyl radicals containing from 1 to 30 carbon atoms. Illustrative examples of alcohols which may be employed include methanol, ethanol, n-propanol, isopropanol, n-butanol, hexanol, cyclohexanol, pentanol, octanol, decanol, dodecanol, benzyl alcohol, phenol and the like. The preferred alcohols are ethanol and octanol.

The preformed $\pi$ allyl catalyst may be prepared using either a batch-type process or a continuous process with the continuous process being preferred. Thus, the preformed catalyst can be prepared by a batch process which involves first charging a blend of 1,3-butadiene in a hydrocarbon solvent to a suitable mixing vessel; then adding the organoaluminum compound preferably in a hydrocarbon solvent, adding alcohol to the vessel and finally adding the nickel borate or cobalt borate compound preferably in a hydrocarbon solvent. The resultant blend, depending on its precise composition, may be admixed at room temperature for a period ranging from 0 to 10 minutes or more.

The preferred continuous process for preparing the preformed $\pi$ allyl catalyst (i.e. $\pi$ allyl nickel or cobalt catalyst) involves a procedure in which the ingredients which make up the catalyst composition are first mixed together in two (2) separate parts, designated hereinafter for convenience as parts Ia and Ib, outside of the polymerization reactor. Thus, in part Ia, the nickel borate or cobalt borate compound, the alcohol, a small amount of 1,3-butadiene and the hydrocarbon solvent are mixed together. In part Ib, the organoaluminum compound and hydrocarbon solvent are mixed together. Parts Ia and Ib are then continuously fed to a feed line leading to the polymerization reactor where they are blended together and react to continuously form the $\pi$ allyl catalyst.

As indicated, the cocatalyst component is a boron trifluoride complex with an alcohol. The alcohols employed in forming the boron trifluoride complexes are in general the same as those utilized in the preformed $\pi$ allyl catalyst. Thus, the alcohols may be represented by the formula ROH wherein R is selected from the group consisting of alkyl, cycloalkyl, aryl and arylalkyl radicals containing from 1 to 30 carbon atoms. Illustrative examples of alcohols which may be suitably employed include methanol, ethanol, n-propanol, isopropanol, n-butanol, hexanol, cyclohexanol, pentanol, octanol, decanol, dodecanol, benzyl alcohol, phenol and the like. The preferred $BF_3$-alcohol complexes are $BF_3$.Ethanol and $BF_3$.Octanol.

The boron trifluoride complexes may be prepared by various procedures. Thus, the boron trifluoride complexes may be prepared by simply dissolving appropriate amounts of the alcohol complexing agent in a suitable solvent and appropriate amounts of the boron trifluoride in a suitable solvent and then mixing the two solvent systems together. The mixing should be conducted in the absence of moisture. An additional method would be to dissolve the boron trifluoride in a suitable solvent and then add the alcohol to the resulting solution. Alternatively, the complexes could be prepared by dissolving the alcohol complexing agent in a suitable solvent and then bubbling the gaseous boron trifluoride through the system until all of the complexing agent has reacted.

Still further, as exemplified in certain of the examples below, the boron trifluoride-alcohol complex can be prepared by means of an exchange reaction in which a boron trifluoride-ether complex such as boron trifluoride diethyl ether is reacted with an alcohol. The exchange reaction can either be conducted outside of the polymerization reactor by mixing the boron trifluoride-ether complex with an alcohol or it can be conducted in-situ in the reactor by feeding the boron trifluoride-ether complex and the preformed $\pi$ allyl catalyst into the reactor. In this latter case, the exchange reaction takes place between the boron trifluoride-ether complex and the alcohol component of the preformed $\pi$ allyl catalyst.

In certain instances, the boron trifluoride-alcohol complex or the boron trifluoride-ether complex (when it is to be used to form the alcohol complex by in-situ exchange reaction) per se may be fed to the polymerization reactor. However, it is generally preferred to employ a solution of the boron trifluoride complex in a hydrocarbon solvent preferably the same hydrocarbon solvent utilized in the monomer solution and preformed catalyst components.

It should further be noted that in cases where a lower alcohol (i.e. an alcohol containing 6 carbon atoms or less such as ethanol or butanol) is employed in forming the boron trifluoride-alcohol complex cocatalyst component, it is preferred to utilize a stabilized cocatalyst component. The stabilized cocatalyst may be prepared by admixing the boron trifluoride-lower alcohol complex or boron trifluoride-ether complex when the alcohol complex is to be formed by in-situ exchange reaction with an organoaluminum compound such as triisobutyl aluminum, a small amount of 1,3-butadiene and a hydrocarbon solvent. The use of a stabilized cocatalyst component provides the significant advantage that the cocatalyst will retain its solubility in hydrocarbon solvent for longer periods of time thereby substantially minimizing possible problems of the cocatalyst either plugging the feed lines leading to the polymerization reactor or of it precipitating out of solution inside of the reactor.

As indicated above, the method of the invention involves continuously feeding the monomer, preformed catalyst and cocatalyst streams to the polymerization reactor. This can be accomplished by continuously and separately feeding the monomer, preformed catalyst and cocatalyst streams to the reactor. However, it is often preferred to first blend the monomer and catalyst streams together prior to injection into the polymerization reactor. It should also be noted that while not a preferred procedure, it may be possible to employ the in-situ method of catalyst composition addition by separately injecting the cobalt borate or nickel borate compound, the organoaluminum compound and the boron trifluoride complex into the reactor.

The nickel borate or cobalt borate compound, the organoaluminum compound, the boron trifluoride and the alcohol interract to form the active catalyst. Accordingly, the optimum concentration for any one catalyst component is dependent upon the concentration of the other components. In the catalyst system employed in the method of the present invention, the polymerization of 1,3-butadiene to polybutadiene may be conducted using a broad range of catalyst component concentrations. Thus, the molar ratios of nickel (Ni) or cobalt (Co) to aluminum (AL) to $BF_3$ to alcohol (ROH) may range from 1:1:1:1 to 1:70:70:280 with the preferred range being from 1:3:3:9 to 1:15:15:60. In addition, the molar ratio of ROH:AL in Part I can range from 0 to 4.0 and the molar ratio of ROH:$BF_3$ in Part II can range from 1:1 to 4:1.

The concentration of the total catalyst composition employed in the method of the invention can vary considerably and is dependent upon factors such as purity, rate of polymerization desired, temperature, and the like. Accordingly, specific overall concentrations of the catalyst compositions cannot be set forth except to state that such concentrations are catalytically effective amounts. Some specific concentrations and ratios which produce polybutadiene polymers having the desired properties are illustrated in the examples below.

The polymerizations of this invention are conducted in an inert hydrocarbon solvent and are consequently solution polymerizations. The term "inert solvent" means that the solvent does not enter into the structure of the resulting polymer, does not adversely affect the properties of the resulting polymer and does not adversely affect the activity of the catalyst employed. Suitable hydrocarbon solvents which may be employed include aliphatic, aromatic or cycloaliphatic hydrocarbons such as hexane, pentane, toluene, benzene, cyclohexane and the like. The preferred hydrocarbon solvents are aliphatic hydrocarbons and of these hexane is particularly preferred.

The polymerizations of the invention should be carried out under an inert atmosphere such as nitrogen and precautions should be taken to exclude materials such as water and air which will deactivate the catalyst components.

The polymerizations may be terminated in well known manner by the addition of a small amount of a lower alcohol such as methanol and an antioxidant such as di-t-butyl cresol.

The polybutadiene polymers can be recovered from solution in known manner by coagulation in an excess of methanol or other lower alkanol. The polymer product can be dried using any convenient method such as vacuum drying, drum drying, extruder drying, steam water desolventizing and the like.

As indicated above, the method of the invention results in higher rates of conversion of monomer to polymer at significantly lower residence times as compared to the prior art continuous processes described above. Thus, the method of the invention provides rates of conversion of >90% at residence times of from about 35 to about 45 minutes.

The final step in the method of the invention involves withdrawing continuously from the polymerization reactor high cis-1,4 polybutadiene polymer at the same rate as the monomer, preformed catalyst and cocatalyst streams are fed to the reactor. Steady state conditions are reached after three (3) residence cycles. At this point in time, the polybutadiene polymer can be removed from the reactor at the same rate as the monomer, preformed catalyst and cocatalyst streams are being fed to the reactor.

As mentioned heretofore, polybutadiene polymers produced by the method of the invention have a high content of cis-1,4 addition along with good green strength and tack. Thus, such polymers have cis-1,4 contents of above 85% and more commonly from about 90% to about 96%. In addition, the method of the invention permits the production of polybutadiene polymers having a broad range of Mooney viscosities. Hence, such polymers may have Mooney viscosities, ML/4@100° C., of from about 20 to about 100.

The following examples are submitted for the purpose of further illustrating the nature of the present invention and are not to be regarded as a limitation on the scope thereof. Parts and percentages shown in the examples are by weight unless otherwise indicated.

EXAMPLE 1

In this example, the continuous polymerization was conducted in a 6.5 gallon continuously stirred tank reactor with a relatively high L/D ratio (3:1).

A purified 1,3-butadiene/hexane blend containing 26 percent by weight of 1,3-butadiene was metered continuously into the reactor. The preformed catalyst and cocatalyst components were metered separately and continuously into the reactor. The preformed catalyst designated Part I for convenience and the cocatalyst designated Part II for convenience were previously prepared as follows.

Part I—To a five gallon stainless steel reactor equipped with thermometer, stirrer, pressure means, inlet and outlet ports which was maintained under a nitrogen atmosphere was charged 2678 grams of 18% triisobutyl aluminum (hereinafter referred to by the abbreviation TIBAL) in hexane; 2554 grams of 1,3-butadiene (23.2%) in hexane; 251 grams of dried n-octanol; and 340 grams of NiOB (1.0M) in hexane. The resultant mixture was stirred at room temperature under nitrogen for 10–15 minutes, at which time the solution took on an orange color indicating the formation of a preformed $\pi$ allyl nickel complex. The complex was transferred into a nine gallon stainless steel tank.

Part II—To a 35 gallon glass-lined mixing tank was charged 25,606 grams of dry hexane, 785 grams of n-octanol (80 ppm $H_2O$) and 334 grams of purified boron trifluoride diethyl ether (hereinafter $BF_3OEt_2$). The mixture was stirred at room temperature for 30 minutes. The ratios of the various components were as follows: 0.5 millimoles (mM) of nickel (Ni) per hundred grams of 1,3-butadiene monomer (phgm), TIBAL/nickel at a molar ratio of 6:1, n-octanol/nickel at a molar ratio of 21:1 and $BF_3OEt_2$/nickel at a molar ratio of 6:1.

The continuous polymerization was carried out at 115° C. with a 40 minute residence time. The polybutadiene solution obtained at a 23.7% total solids content was terminated with a small amount of isopropanol and an antioxidant, coagulated in an excess of methanol and was drum-dried. The conversion of monomer to polymer was 94%. The microstructure of the polymer obtained was 92%, 1,4-cis, 6.5% 1,4-trans, and 1.5% 1,2, respectively. The polymer had a Mooney Viscosity, $ML_4$@100° C., of 30 and a Dilute Solution Viscosity (DSV) of 2.0.

EXAMPLES 2–4

In these examples, Example 1 was substantially repeated except that the weights and molar ratios of components and the polymerization conditions were varied.

The weights and molar ratios of the various components used in the polymerization, the polymerization conditions and the properties of the resultant polymer are shown in Table I.

TABLE I

| | Example # | | |
|---|---|---|---|
| | 2 | 3 | 4 |
| Bd. Wt. % | 20.2 | 20.9 | 20.9 |
| NiOB mM phgm | 0.55 | 0.52 | 0.53 |
| Ratio of Catalyst Components | | | |
| Part I: | | | |
| TIBAL/Octanol/Ni | 6:4.8:1 | 6:4.3:1 | 6:4.85:1 |
| Part II: | | | |
| Octanol/$BF_3OEt_2$ | 13:5.2 | 15:5.8 | 13.8:5.5 |
| Polymerization Conditions | | | |
| Temp °C. - Top of Reactor | 116 | 106 | 116 |
| Temp °C. - Bottom of Reactor | 46 | 54 | 71 |
| Residence Time (Min.) | 40 | 40 | 40 |
| % Conversion | 92–94 | 98–100 | 100 |
| Polymer Properties | | | |
| Microstructure | | | |
| Cis-1,4 | 93.8 | 93.0 | 92.3 |
| Trans-1,4% | 4.9 | 5.6 | 5.9 |
| 1,2% | 1.3 | 1.4 | 1.8 |
| DSV | 2.65 | 2.35 | 2.00 |
| $ML_4$ @ 100° C. | 56 | 46 | 42 |

EXAMPLE 5

This example illustrates the continuous method of the invention in which the preformed catalyst was prepared by a continuous process.

In this example, a polymerization reactor equipped with thermometer, stirrer, pressure means, inlet and outlet ports which was maintained under a nitrogen atmosphere was first filled with hexane. The reactor was heated to about 93° C. with pressure controlled at 80 p.s.i.g. Then, metering of the catalyst in two parts designated Ia and Ib along with a butadiene/hexane blend containing 19.4% by weight of 1,3-butadiene through a feed line leading to the bottom portion of the reactor was started. At almost the same time, metering of the cocatalyst designated Part II through a separate feed line leading to the bottom portion of the reactor was started.

Catalyst Part Ia was prepared outside of the reactor using the following procedure:

To a 20 gallon mixing vessel equipped with thermometer, stirrer, pressure means, inlet and outlet ports which was maintained under a nitrogen atmosphere were charged 20.9 lbs. of hexane, 176.0 grams of NiOB (1.02M), 0.46 lbs. of octanol and 39.7 lbs. of a butadiene/hexane blend containing 23.5% by weight of 1,3-butadiene. The resulting blend was mixed under agitation for about 5 minutes.

Catalyst Part Ib was also prepared outside of the reactor by admixing TIBAL with hexane to form a solution containing 18% by weight of TIBAL. The molar ratio of TIBAL/octanol/nickel employed in catalyst Part I was 10/7.5/1.

Cocatalyst Part II was prepared outside of the reactor in accordance with the following procedure:

To a 35 gallon mixing vessel equipped as above was charged 54.7 lbs. of hexane, 1.7 lbs. of octanol and 323.0 grams of $BF_3OEt_2$. The resulting blend was mixed under agitation for about 15 minutes. The molar ratio of octanol/B employed in the cocatalyst was 2.5/1.

The overall molar ratio of components employed in the catalyst composition was B/AL=1.1/1 and octanol/AL=3.5/1. The catalyst composition provided 0.5 mM of nickel phgm.

The continuous polymerization was conducted adiabatically at 107° C. at a residence time of 36 minutes by continuously feeding the monomer blend, catalyst Parts Ia and Ib and cocatalyst Part II to the polymerization reactor. After steady state conditions were reached, the polybutadiene polymer was being removed from the reactor at the same rate as the monomer catalyst and cocatalyst streams were being metered to the reactor.

A sample of polybutadiene removed from the reactor was analyzed with the following results:

| % Conversion = | 93 |
|---|---|
| Polymer Microstructure | |
| % Cis-1,4 = | 93 |
| % Trans-1,4 = | 6 |
| % 1,2 = | 1 |
| ML/4 @ 100° C. = | 43 |
| DSV = | 2.3 |

EXAMPLE 6

In this example, the procedure of Example 5 was substantially repeated with the exceptions that the butadiene/hexane blend contained 19.8% 1,3-butadiene; the molar ratio of TIBAL/octanol/nickel in Parts Ia and Ib of the catalyst was 5.8/4.5/1; the molar ratio of octanol/B in the Part II cocatalyst was 2.0/1; the overall molar ratio of B/AL was 1.2/1; the overall molar ratio of octanol/AL was 3.2/1; the catalyst composition contained 0.51 mM of nickel phgm and the residence time was 37 minutes.

A sample of polybutadiene polymer taken after three (3) residence times was analyzed and showed the following results:

| % Conversion = | 93 |
|---|---|
| Polymer Microstructure | |
| % Cis-1,4 = | 95 |
| % Trans-1,4 = | 3.8 |
| % 1,2 = | 1.2 |
| ML/4 @ 100° C. = | 53 |
| DSV = | 2.3 |

EXAMPLE 7

This example illustrates the use of ethanol in the preformed catalyst, the formation of the $BF_3$-alcohol complex by in-situ exchange reaction and the use of a stabilized cocatalyst component.

In this example, the continuous polymerization was conducted adiabatically at 82° C. in a 6.5 gallon stirred reactor using the following procedure: a purified 1,3-butadiene/hexane blend containing 18% by weight of 1,3-butadiene was metered continuously into the reactor. The preformed catalyst and cocatalyst components were metered separately and continuously into the reactor. The preformed catalyst designated Part I and the cocatalyst designated Part II for convenience were previously prepared as follows:

Part I. To a five gallon reactor equipped with thermometer, stirrer, pressure means, inlet and outlet ports which was maintained under a nitrogen atmosphere were charged 1284 grams of 18% TIBAL, 186 grams of ethanol, 524 grams of a butadiene/hexane blend containing 40% by weight of 1,3-butadiene and 207.6 grams (1.1M) of NiOB. The molar ratio of ethanol/TIBAL/nickel was 16.8/4.8/1. The resultant blend was stirred well and then aged for three (3) days.

Part II. To a 20 gallon mixing vessel were charged 54.5 lbs. of a butadiene/hexane blend containing 18.2% by weight of 1,3 butadiene, 123 grams of 18% TIBAL and 184 grams of $BF_3OEt_2$. The resultant blend was mixed for 15 minutes. The molar ratio of B/AL in Part II was 12/1.

The overall molar ratio of B/AL in the catalyst composition was 1.3/1. The catalyst system contained 0.53 mM nickel phgm.

The polymerization was conducted continuously using a residence time of 40 minutes. After the polymerization reached steady state conditions, the polybutadiene polymer could be removed from the top of the reactor at the same rate as the monomer blend, the preformed catalyst and cocatalyst streams were being metered into the bottom of the reactor.

A sample of polybutadiene removed from the reactor was analyzed with the following results:

| % Conversion = | 93 |
|---|---|
| Polymer Microstructure | |
| % Cis-1,4 = | 96.6 |
| % Trans-1,4 = | 1.6 |

| | |
|---|---|
| % 1,2 = | 1.8 |
| ML/4 @ 100° C. = | 49 |
| DSV = | 2.3 |

We claim:

1. A method for preparing high cis-1,4 polybutadiene by a continuous polymerization process which comprises continuously polymerizing 1,3-butadiene in solution under adiabatic conditions, said method comprising the steps of:
   (I) feeding continuously to a single agitated polymerization reactor:
      (a) a monomer stream comprising 1,3-butadiene in a hydrocarbon solvent;
      (b) a preformed $\pi$ allyl catalyst stream formed by admixing a carboxylated metal oxy borate compound represented by the formulae (RCOO-MO)$_3$B or (RCOOMO)$_2$B-OR' wherein R and R' are alkyl radicals containing from 7 to 17 carbon atoms and M is nickel or cobalt, an organoaluminum compound, an alcohol, a small amount of 1,3-butadiene and a hydrocarbon solvent; and
      (c) a cocatalyst stream comprising a boron trifluoride complex with an alcohol; and
   (II) withdrawing continuously from said reactor high cis-1,4 polybutadiene at the same rate as said monomer, preformed catalyst and cocatalyst streams are fed to the reactor.

2. The method of claim 1 wherein said monomer and said preformed catalyst streams are blended just prior to feeding them into the reactor.

3. The method of claim 1 wherein said hydrocarbon solvent is hexane.

4. The method of claim 1 wherein said carboxylated metal oxy borate compound is represented by the formula (RCOOMO)$_3$B wherein R is an alkyl radical containing from 7 to 11 carbon atoms.

5. The method of claim 4 wherein M is nickel.

6. The method of claim 1 wherein said organoaluminum compound is a trialkyl aluminum compound.

7. The method of claim 6 wherein said trialkyl aluminum compound is triisobutyl aluminum.

8. The method of claim 1 wherein said alcohol is an alcohol represented by the formula ROH wherein R is selected from the group consisting of alkyl, cycloalkyl, aryl, and arylalkyl radicals containing from 1 to 30 carbon atoms.

9. The method of claim 1 wherein said alcohol is ethanol or octanol.

10. The method of claim 1 wherein said boron trifluoride complex with an alcohol is a boron trifluoride complex with ethanol or octanol.

11. The method of claim 1 wherein said cocatalyst stream further includes a hydrocarbon solvent.

12. The method of claim 1 wherein the molar ratios of Ni or Co:AL:BF$_3$:alcohol range from 1:1:1:1 to 1:70:70:280.

13. The method of claim 1 wherein the molar ratios of Ni or Co:AL:BF$_3$:alcohol range from 1:3:3:9 to 1:15:15:60.

14. A method for continuously preparing a preformed $\pi$ allyl catalyst which comprises the steps of:
   (a) preparing a first blend by mixing a carboxylated metal oxy borate compound represented by the formulae (RCOOMO)$_3$B or (RCOOMO)$_2$B-OR' wherein R and R' are alkyl radicals containing from 7 to 17 carbon atoms and M is nickel or cobalt, an alcohol, a small amount of 1,3-butadiene and a hydrocarbon solvent.
   (b) preparing a second blend by mixing an organoaluminum compound with a hydrocarbon solvent; and
   (c) continuously mixing said first blend and said second blend together to thereby form said preformed catalyst.

15. The method of claim 14 wherein said carboxylated metal oxy borate compound is represented by the formula (RCOOMO)$_3$B wherein R is an alkyl radical containing from 7 to 11 carbon atoms.

16. The method of claim 14 wherein said alcohol is ethanol or octanol.

17. The method of claim 14 wherein said hydrocarbon solvent is hexane.

18. The method of claim 14 wherein said organoaluminum compound is triisobutyl aluminum.

* * * * *